United States Patent
Baik et al.

(10) Patent No.: US 8,909,873 B2
(45) Date of Patent: Dec. 9, 2014

(54) TRAFFIC CONTROL METHOD AND APPARATUS OF MULTIPROCESSOR SYSTEM

(75) Inventors: Min Seung Baik, Seoul (KR); Joong Baik Kim, Seoul (KR); Seung Wook Lee, Suwon-si (KR); Soon Wan Kwon, Gwangju-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/224,668

(22) Filed: Sep. 2, 2011

(65) Prior Publication Data
US 2012/0060007 A1    Mar. 8, 2012

(30) Foreign Application Priority Data
Sep. 3, 2010 (KR) .................. 10-2010-0086410

(51) Int. Cl.
*G06F 12/00* (2006.01)
*G06F 15/173* (2006.01)

(52) U.S. Cl.
CPC .................. *G06F 15/17325* (2013.01)
USPC ............. 711/151; 711/163; 711/E12.091

(58) Field of Classification Search
USPC .......... 711/151, 163, E12.091; 712/130, 712/E9.003
See application file for complete search history.

(56) References Cited

U.S. PATENT DOCUMENTS

| | | | |
|---|---|---|---|
| 5,815,492 A * | 9/1998 | Berthaud et al. ............ 370/234 |
| 7,500,015 B2 * | 3/2009 | Hiyama et al. ............. 709/242 |
| 7,533,201 B2 * | 5/2009 | Chew .......................... 710/56 |
| 8,477,610 B2 * | 7/2013 | Zuo et al. ................... 370/230 |
| 2003/0026207 A1 * | 2/2003 | Loguinov .................... 370/235 |
| 2003/0110290 A1 * | 6/2003 | Hiyama et al. ............. 709/242 |
| 2007/0058669 A1 * | 3/2007 | Hoffmann et al. ......... 370/466 |
| 2009/0219818 A1 * | 9/2009 | Tsuchiya .................... 370/236 |
| 2010/0195503 A1 * | 8/2010 | Raleigh ...................... 370/235 |
| 2011/0022812 A1 * | 1/2011 | van der Linden et al. ... 711/163 |
| 2011/0292792 A1 * | 12/2011 | Zuo et al. ................... 370/230 |

OTHER PUBLICATIONS

Chu et al. (A QoS Architecture for the MAC Protocol of IEEE 802.16 BWA System; 2002).*
Roberts (Internet Traffic, QoS, and Printing; 2004).*
Lin et al. (QoS Routing in Ad Hoc Wireless Networks; 1999).*
Roughan et al. (Class of Serving Mapping for QoS: A Statistical-based Approach to IP Traffic Classification); 2004).*

* cited by examiner

*Primary Examiner* — Mardochee Chery
(74) *Attorney, Agent, or Firm* — Jefferson IP Law, LLP (57) ABSTRACT

A method and apparatus for controlling traffic of multiprocessor system or multi-core system is provided. The traffic control apparatus of a multiprocessor system according to the present invention includes a request handler for processing a traffic request of a first processor, and a Quality of Service (QoS) manager for receiving a QoS guaranty start instruction for a second processor from the multiprocessor system, and for transmitting, when traffic of the second processor is detected, a traffic adjustment signal to the request handler. The request handler adjusts the traffic of the first processor according to the received traffic adjustment signal. The traffic control method and apparatus of the present invention is capable of adjusting the required bandwidths of individual technologies and guaranteeing the real-timeness in the multiprocessor system or multi-core system.

22 Claims, 5 Drawing Sheets

TRAFFIC CONTROL METHOD AND APPARATUS OF MULTIPROCESSOR SYSTEM

PRIORITY

This application claims the benefit under 35 U.S.C. §119 (a) of a Korean patent application filed on Sep. 3, 2010 in the Korean Intellectual Property Office and assigned Ser. No. 10-2010-0086410, the entire disclosure of which is hereby incorporated by reference.

BACKGROUND OF THE INVENTION

1. Field of the Invention

The present invention relates to a method and apparatus for controlling data traffic. More particularly, the present invention relates to a method and apparatus for controlling traffic of a multiprocessor system or a multi-core system.

2. Description of the Related Art

Recent mobile devices are diversified in type and equipped with various applications for supporting multimedia functions. To support the various applications and multimedia functions, there is a need for a high performance and low power system. A multiprocessor system is becoming a key issue for addressing these requirements.

In a multiprocessor system incorporating a multi-Central Processing Unit (multi-CPU) system, multi-Digital Signal Processor (multi-DSP), and multi-Graphics Processing Unit (multi-GPU) (including multi-core system), individual technologies are operating in cooperation with each other or independently on different bandwidths in real time. Such operations cause a large amount of system traffic, resulting in collisions of communications among individual technologies. Accordingly, it is a significant issue to schedule the traffic of individual technologies in an effective order to achieve maximum throughput while minimizing the probability of traffic collision.

In order to guarantee Quality of Service (QoS), the conventional method controls the QoS/Arbitration scheme supported by BUS and memories. The conventional method uses the pre-estimated information for control rather than analyzing information in real time. However, the conventional method has large system overhead for transitioning from a previously used scheme to another scheme.

The conventional method controls the QoS and Arbitration schemes provided by the individual technologies controlled at the time points programmed by software. Such a method can be applied for guaranteeing QoS in a relatively long term scenario. However, the conventional method cannot be used in a short term scenario where the QoS guaranty should be secured momentarily due to the large system overhead. Also, the conventional method does not account for the multiple processors or cores because the throughput of the entire system is likely to be degraded. Furthermore, since the conventional method operates only in a predetermined scheme, it is impossible to support various scenarios.

SUMMARY OF THE INVENTION

Aspects of the present invention are to address at least the above-mentioned problems and/or disadvantages and to provide at least the advantages described below. Accordingly, an aspect of the present invention is to provide a traffic control apparatus and method of a multiprocessor system that is capable of achieving real-timeness operation by controlling required bandwidths of individual technologies.

In accordance with an aspect of the present invention, a traffic control apparatus of a multiprocessor system is provided. The apparatus includes a request handler for processing a traffic request of a first processor, and a Quality of Service (QoS) manager for receiving a QoS guaranty start instruction for a second processor from the multiprocessor system and, for transmitting, when traffic of the second processor is detected, a traffic adjustment signal to the request handler, wherein the request handler adjusts the traffic of the first processor according to the traffic adjustment signal.

In accordance with another aspect of the present invention, a traffic control method of a multiprocessor system is provided. The method includes processing, at a request handler, a traffic request of a first processor, receiving, at a QoS manager, a QoS guaranty start instruction for a second processor from the multiprocessor system, transmitting, when traffic of the second processor is detected, a traffic adjustment signal from the QoS manager to the request handler, and adjusting, at the request handler, the traffic of the first processor according to the traffic adjustment signal.

Other aspects, advantages, and salient features of the invention will become apparent to those skilled in the art from the following detailed description, which, taken in conjunction with the accompanying drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, description of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the drawings, certain elements may be exaggerated or omitted or schematically depicted for clarity of the invention, and the actual sizes of the elements are not reflected.

A description is made of the traffic control apparatus and method according to exemplary embodiments of the present invention with reference to accompanying drawings.

The features and advantages of the invention will be set forth in, or apparent from, the detailed description of exemplary embodiments found hereinbelow. It is to be understood that the present invention is not limited to the embodiments specifically disclosed and exemplified herein, but that various changes and modifications of the invention will be apparent to those skilled in the art without departing from the scope of the appended claims.

Figure 1:
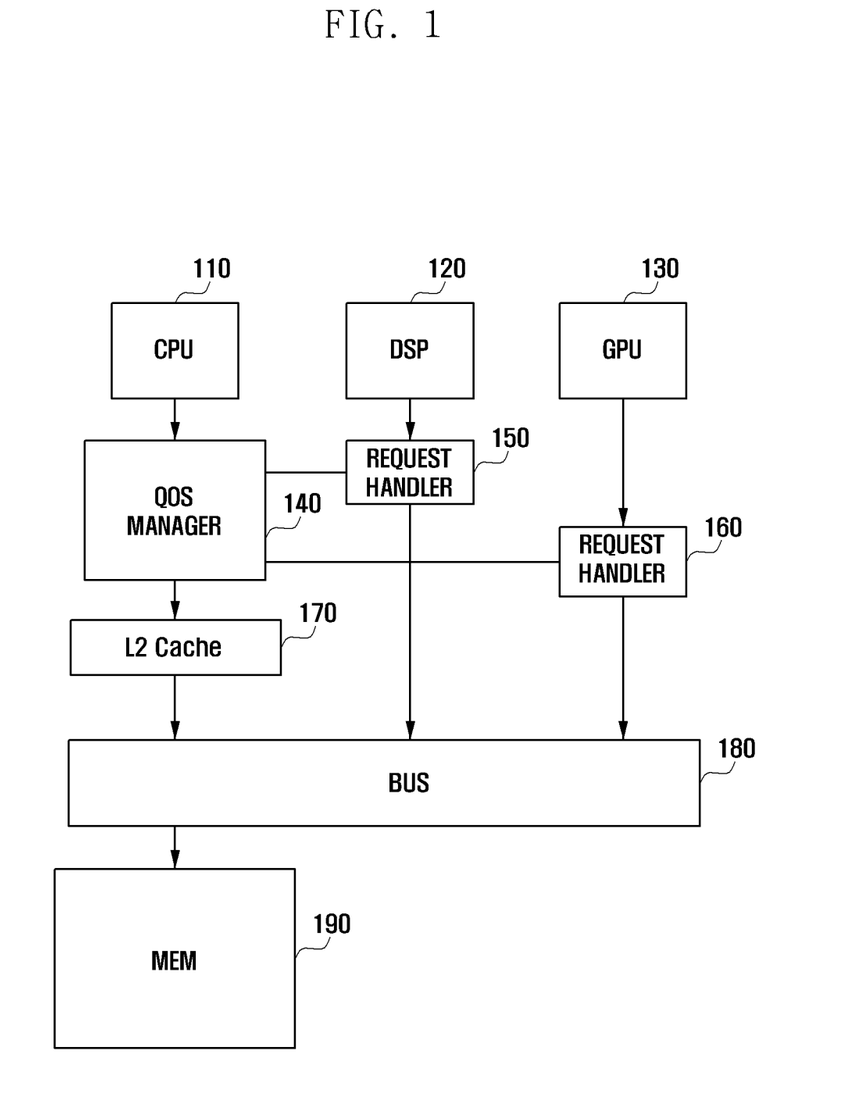
FIG. 1 is a block diagram illustrating a configuration of a traffic control apparatus according to a first exemplary embodiment of the present invention.

FIG. 1 is a block diagram illustrating a configuration of a traffic control apparatus according to a first exemplary embodiment of the present invention.

Referring to FIG. 1, the traffic control apparatus includes a Central Processing Unit (CPU) 110, a Digital Signal Processor (DSP) 120, a Graphics Processing Unit (GPS) 130, a Quality of Service (QoS) Manager 140, request handlers 150 and 160, a Level 2 (L2) Cache 170, a BUS 180, and a memory 190.

The CPU 110, the DSP 120, and the GPU 130 are processors to perform operations. The CPU 110, the DSP 120, and the GPU 130 are processors for controlling traffic according to an exemplary embodiment of the present invention. Although the description is directed to the case of an apparatus including the CPU 110, the DSP 120, and the GPU 130, the CPU 110, the DSP 120, and the GPS 130 can be substituted by other processing units. Also, although it is described that the QoS is controlled per processor, the QoS can be controlled per core in a multi-core processor according to an exemplary implementation of the present invention. The part or unit performing a control is referred to as master. That is, each core becomes the master for the system in which the QoS control is done per core, and each processor becomes the master for the system in which the QoS control is done per processor. In the following, the description is directed to the case where each processor is the master.

The QoS manager 140 performs instant traffic control by decoding the writing in the indicating address region or changes scenarios according to the QoS level. The QoS manager 140 analyzes the traffic state of each processor and compensates the QoS level according to the analysis result.

The request handlers 150 and 160 measure the traffic states of individual processors and notify the QoS manager 140 of the traffic state information. The request handlers 150 and 160 can analyze the information efficiently with minimum traffic including request and response signals but not the control and data signals. The request handlers 150 and 160 are also responsible for switching between the traffic of the individual processors according to the instruction of the QoS manager 140. That is, the request handlers 150 and 160 control to guarantee QoS of the traffic of the processor requiring QoS guaranty by limiting the traffic of other processors.

The L2 cache 170 denotes the cache memory device embedded on the main board of a computer. The L2 cache 170 is also referred to as secondary cache. For example, the main board of the computer using an i486 or above CPU of the Intel Corporation of the United States is provided with L2 cache. The L2 cache has a memory capacity greater than that of the primary cache and an access speed faster than the main memory but slower than the primary cache.

The L2 cache 170 is interposed between the CPU 110 and the BUS 110 so as to contribute to improving performance in case of requesting the same data repeatedly.

Since the configuration and operation principle of the L2 cache is out of the scope of the present invention, detailed description thereof is omitted herein.

Although the description is directed to the case where the L2 cache 170 is a mandatory component, the present invention is not limited thereto. Although it has been explained that the L2 cache is used in the computer, the L2 cache can be used in the devices such as a mobile terminal, an electric appliance, a communication device, and the like.

The BUS 180 is a medium shared by the internal and external components to transfer data and power. It also can be referred to as bus line. A computer is provided with an internal bus for CPU and video card and various input/output devices and an external bus for peripheral devices.

In an exemplary embodiment of the present invention, the bus 180 connects the CPU 110, DSP 120, and memory 190 to each other.

Since the configuration and operation of the bus 180 are well-known, a detailed description thereof is omitted herein.

Although the description is directed to a computer system having a bus 180, the bus can be used in a mobile terminal, an electric appliance, a communication device, and the like.

The memory 190 is responsible for storing data that are written and read by the processors 110, 120, and 130.

Figure 2:
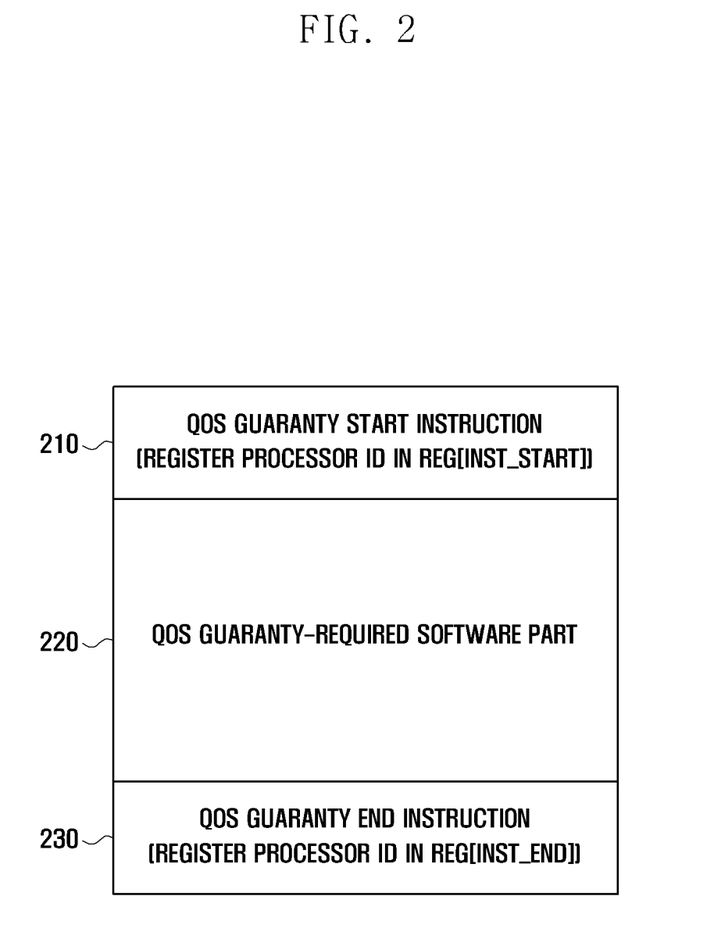
FIG. 2 is diagram illustrating a structure of software for use in the traffic control method according to the first exemplary embodiment of the present invention.

FIG. 2 is diagram illustrating a structure of software for use in the traffic control method according to the first exemplary embodiment of the present invention.

Referring to FIG. 2, the software running in the system includes a QoS guaranty start instruction part 210, a QoS guaranty-required software part 220, and a QoS guaranty end instruction part 230. That is, the QoS guaranty start instruction part 210 is arranged prior to the QoS guaranty-required software part 220, and the QoS guaranty end instruction 230 is arranged after the QoS guaranty-required software part 220. FIG. 2 shows the structure of a part of the software which requires the QoS guaranty but not the entire software. If the entire software is required to be QoS-guaranteed, the software structure of FIG. 2 can be of the entire software.

Figure 3:
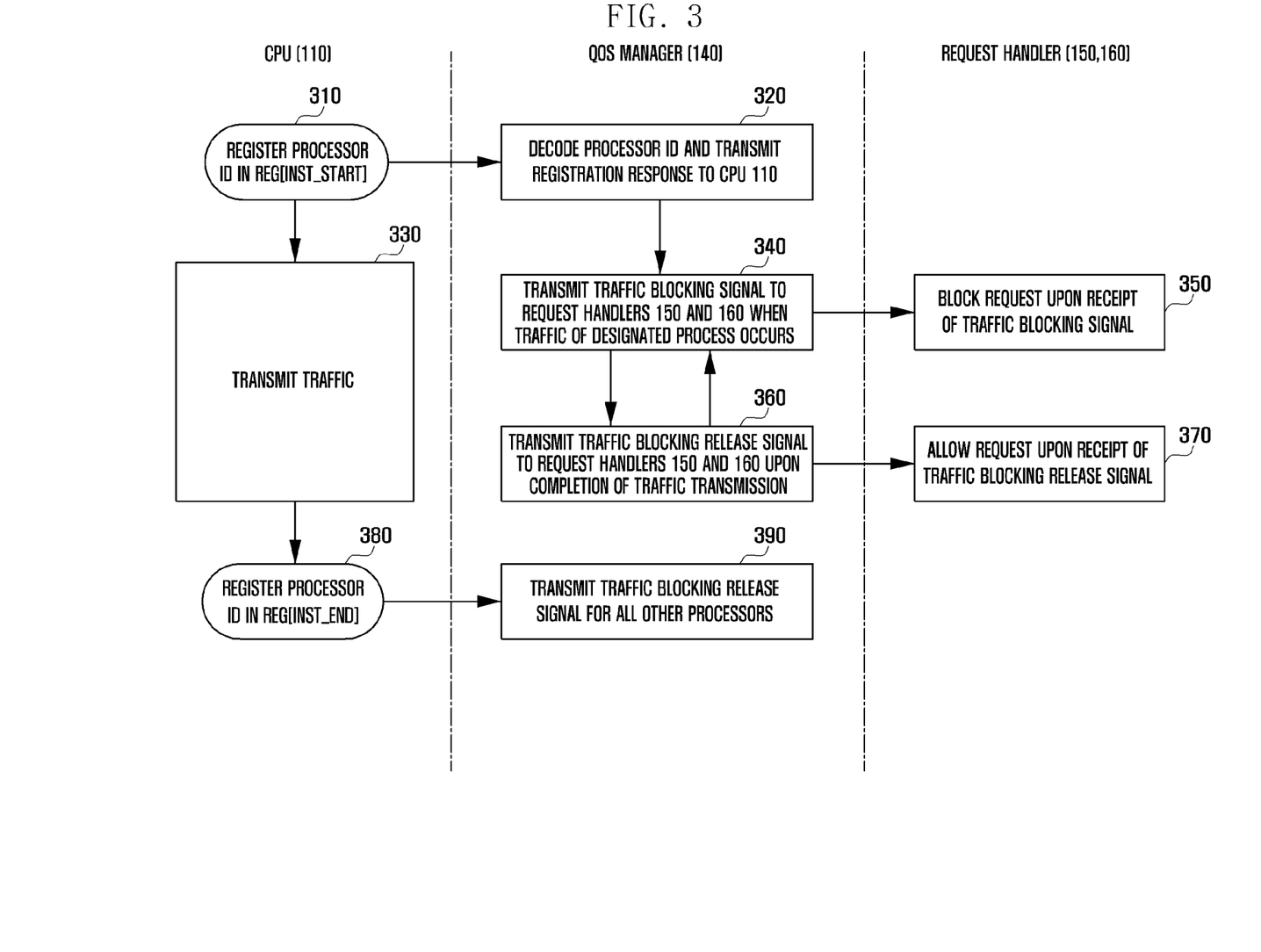
FIG. 3 is a flowchart illustrating a traffic control method according to the first exemplary embodiment of the present invention.

FIG. 3 is a flowchart illustrating a traffic control method according to the first exemplary embodiment of the present invention. FIG. 3 shows an exemplary procedure in case of using the software structured as shown if FIG. 2.

Referring to FIG. 3, the CPU 110 executes the QoS guaranty start instruction part 210 of the software of FIG. 2 to register the ID of the processor requiring QoS guaranty in the register (Reg[INST_START]) at step 310. Here, it is assumed that the processor requiring QoS guaranty is the CPU 110. The ID of the CPU 110 is registered in the Reg[INST_START]. The QoS manager 140 decodes the processor ID registered in the Reg[INST_START] and sends a registration response to the CPU 110 at step 320. It may take 3~5 cycles for response. The QoS manager 140 decodes the processor ID registered in Reg[INST_START] to determine that the CPU 110 requires QoS guaranty. Although the description is directed to the case where the QoS guaranty start instruction is transferred by the CPU 110 registering the information in the register of the QoS manager 140, the QoS guaranty start instruction can be transferred using another form of communication. Also, another component of the system can transfer the QoS guaranty start instruction.

Upon receipt of the registration response, the CPU 110 executes the QoS guaranty-required software part 220 to transmit traffic at step 330. As described with reference to FIG. 1, the CPU 110 transmits/receives traffic by means of the QoS manager 140.

The QoS manager 140 monitors to detect traffic of a designated processor (i.e., the CPU 110) and, if traffic is detected, sends a traffic adjustment signal to the request handlers 150 and 160 connected to other processors at step 340. Upon receipt of the traffic adjustment signal, the request handlers 150 and 160 adjust the traffic of the processors 120 and 130 respectively connected thereto according to the traffic adjustment signal at step 350. For example, if the traffic adjustment signal is a traffic blocking signal, the request handlers 150 and 160 block the traffic of the processors 120 and 130 connected thereto respectively. Referring to the exemplary configuration of FIG. 1, the request handlers 150 and 160 block the traffic of the DSP 120 and GPU 130 to guarantee the QoS for the CPU 110 at a predetermined level.

The traffic adjustment signal includes information for identifying the traffic adjustment method. For example, the traffic adjustment method can be to allow a predetermined amount of traffic, reject all traffic requests, or restrict specific types of traffic. The traffic adjustment can be performed such that traffic is not written to the memory while reading traffic out of the memory is allowed. The traffic adjustment method can be preconfigured or changed according to the QoS scenario and QoS level as to be described with reference to FIGS. 4 and 5 and Table 1. An exemplary traffic adjustment method is described below with reference to FIGS. 4 and 5 and Table 1. A description is also made of the traffic adjustment signal.

The QoS manager 140 monitors to detect completion of traffic transmission of the CPU 110 and, if the traffic transmission has completed, transmits a traffic blockage release signal to the request handlers 150 and 160 connected to the other processors at step 360. If the traffic blockage release signal is received, the request handlers 150 and 160 release the blockage of the traffic of the processors connected thereto at step 370. That is, the request handlers 150 and 160 allow the traffic of the processors respectively connected thereto. Referring to the exemplary configuration of FIG. 1, the request handlers 150 and 160 allow the traffic of the DSP 120 and the GPU 130 such that the DSP 120 and the GPU 130 continue operations.

The CPU 110 executes the QoS guaranty end instruction part 230 to register the ID of the processor for which the QoS guaranty should be ended in the register (Reg[INST_END]) at step 380. Here, since the QoS for the CPU 110 is being guaranteed, the QoS guaranty for the CPU 110 is ended and the ID of the CPU 110 is registered in the Reg[INST_END].

The QoS manager 140 decodes the processor ID registered in the Reg[INST_END] at step 390. The QoS manager 140 can identify the CPU 110 for which the QoS guaranty ends based on the decoded processor ID. Although the description is directed to the case where the CPU 110 transfers the QoS guaranty end instruction by registering the identity information in the register of the QoS manager 140, it is also possible to transfer the QoS guaranty instruction using another type of communication. Also, it is possible to instruct to end the QoS guaranty only by transmitting a signal including the indicator indicating QoS guaranty end instruction without transmission of a process ID. If the signal containing the indicator indicating the QoS guaranty end is received, the QoS manager 140 processes the QoS guaranty end instruction by ending the QoS guaranty for the processor that is currently being QoS-guaranteed.

By blocking the traffic for a processor while the QoS guaranty-required software part is processed, it is possible to guarantee the QoS for the other processor.

Although the description is directed to the case where the QoS for the CPU 110 connected to the QoS manager 140 is guaranteed in the first exemplary embodiment, additional exemplary embodiments guarantee the QoS for the processors connected to the request handlers 150 and 160, i.e. DSP 120 and GPU 130. For example, if the QoS guaranty for the DSP 120 is required, the request handler 150 monitors to detect traffic occurrence and transmission completion and, if a traffic occurrence or traffic transmission completion event is detected, sends the traffic state information to the QoS manager 140. The QoS manager 140 can control the traffic of other processors according to the traffic state information received from the request handler 150. That is, if the information on the traffic occurrence by the DSP 120 is received from the request handler 150, the QoS manager 140 sends a traffic blocking signal to the request handler 160 so as to block the traffic of the CPU 110. On the contrary, if the information on the traffic transmission completion of the DSP 120 is received from the request handler 150, the request handler 160 sends a traffic blocking release signal to the request handler 160 to release the blocking of the traffic of the CPU 110.

In the first exemplary embodiment, the QoS manager 140 is responsible for monitoring and controlling the traffic of the CPU 110. The request handlers 150 and 160 perform similar roles. Accordingly, it is possible to separate the roles overlapped with those of the request handlers 150 and 160 from the QoS handler 140 such that the QoS manager 140 performs only the role of controlling the request handlers 150 and 160.

The method of this exemplary embodiment can be applied to the case where the period for which QoS is required is very short. In order to support instant QoS guaranty, up to 10 cycles are required as overhead. This is the cycle overhead reduced up to 1/10 as compared to about 100 cycles in the Advanced Peripheral Bus (APB) access standard required for recovering from the change of QoS scheme.

An exemplary QoS manager 140 of the present invention can support instant QoS guaranty and control the entire QoS required in the multi-core or multiprocessor system dynamically in adaptation to the application and current system states.

For example, the scenario can be defined by the user as shown in Table 1. A few scenarios can be selected in the range that can be considered and, the following description is made in consideration of two scenarios and traffic control of the technologies of the bus 180 and the memory 190. However, the QoS scenario and QoS level can be set without limitation, and QoS guaranty can be applied to the other technologies.

TABLE 1

| QoS scenario | IPs | QoS level | | | |
|---|---|---|---|---|---|
| | | 0 | 1 | 2 | 3 |
| GPU oriented | Bus | Assign additional adjustment slot to GPU and apply bus QoS guaranty | Assign additional adjustment slot to GPU and apply bus QoS guaranty | Check request handler and reassign adjustment slot | Check request handler and reassign adjustment slot |

TABLE 1-continued

| QoS scenario | IPs | QoS level 0 | 1 | 2 | 3 |
|---|---|---|---|---|---|
| | Memory | Guarantee memory QoS | X | X | X |
| | Request handler | Guarantee additional QoS by blocking traffic | Guarantee additional QoS by blocking traffic | X | X |
| Operation of specific application in CPU | Bus | Assign adjustment slot to CPU | Assign adjustment slot to CPU | X | X |
| | Memory | Guarantee memory QoS | X | X | X |
| | Request handler | Guarantee additional QoS by blocking traffic | Guarantee additional QoS by blocking traffic | X | X |

The user can register the codes for controlling the individual technologies with the QoS manager 140. This means that the QoS manager 140 can control all the technologies without being limited to specific technologies.

The QoS manager 140 can include a plurality of QoS scenarios of which each is assigned a plurality of QoS levels. The QoS scenario can be determined according to the processor for which the QoS guaranty is required. Table 1 is designed for an exemplary case of guaranteeing the QoS for the GPU (GPU-oriented) and the QoS of the CPU (operation of specific application in the CPU). The QoS level is the indicator for indicating the intensity of the QoS guaranty in the corresponding QoS scenario. Referring to Table 1, while the additional adjustment slot is assigned and guarantee the QoS for the bus 180, memory 190, and request handlers 150 and 160, at level 0 of the GPS-oriented scenario, at levels 2 and 3, only the adjustment slot reassignment operation is performed after checking the request handlers 150 and 160. That is, the QoS is guaranteed to different extents according to the QoS level.

The QoS scenario and QoS level-based QoS guaranty handling scheme can be configured by a user or preconfigured by the software builder or the system manufacturer.

Figure 4:
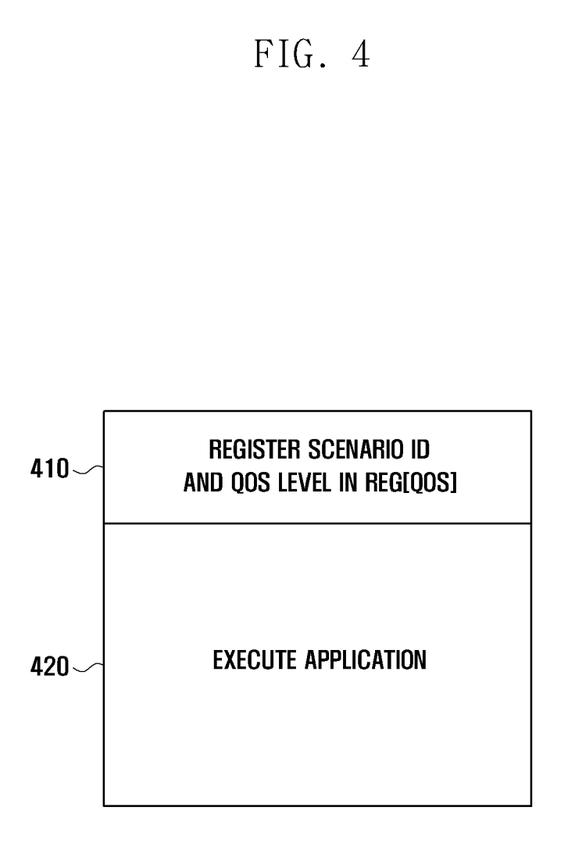
FIG. 4 is a diagram illustrating a structure of software according to a second exemplary embodiment of the present invention.

FIG. 4 is a diagram illustrating a structure of software according to a second exemplary embodiment of the present invention.

Referring to FIG. 4, the software includes a QoS scenario ID and QoS level indication part 410 and an application execution part 420. The QoS manager 140 checks the QoS scenario ID and QoS level indication part to determine the QoS management scheme and executes the application execution part 420.

Figure 5:
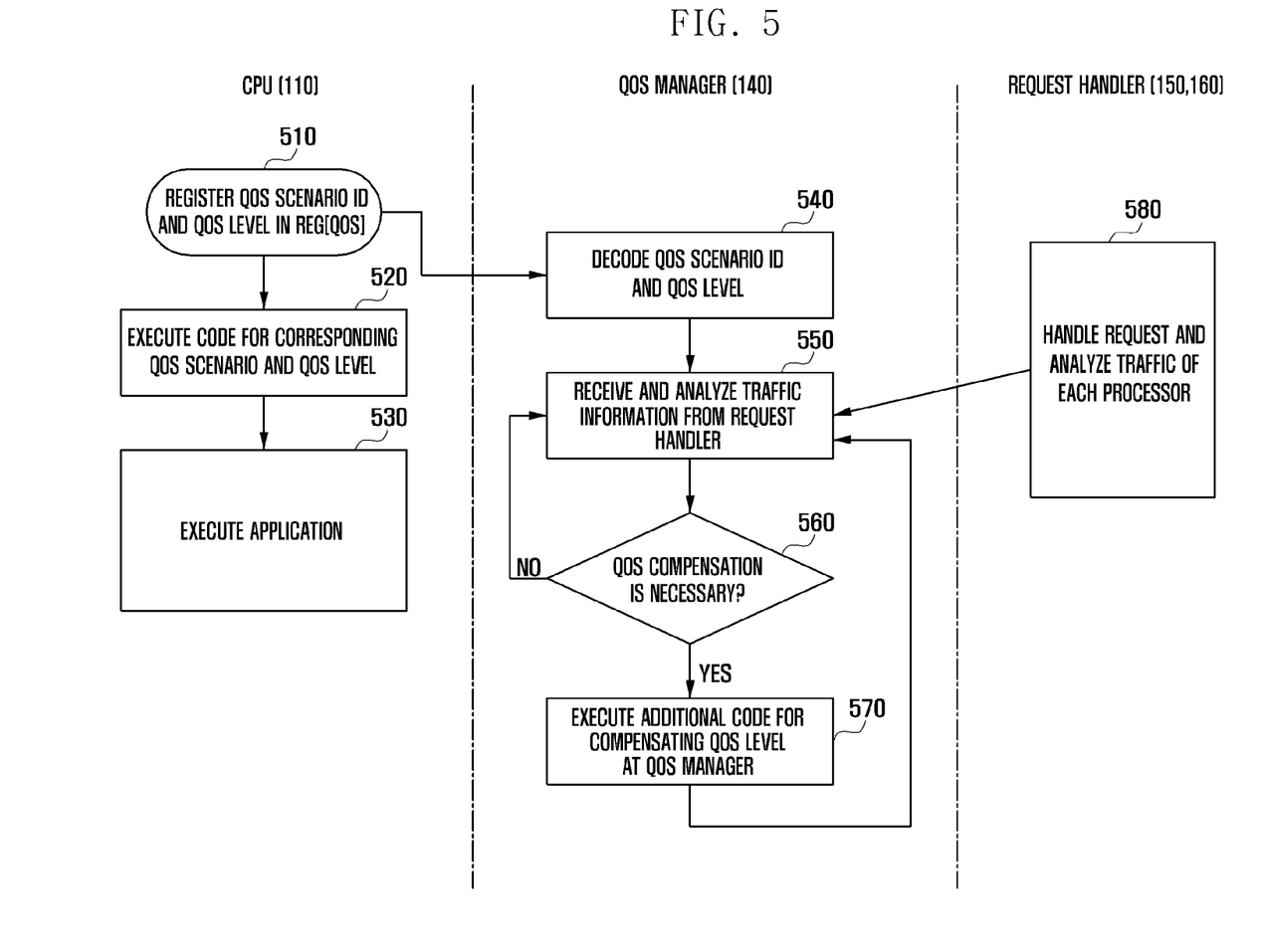
FIG. 5 is a flowchart illustrating a traffic control method according to the second exemplary embodiment of the present invention.

FIG. 5 is a flowchart illustrating a traffic control method according to the second exemplary embodiment of the present invention.

The CPU 110 checks the QoS scenario ID and QoS level indication part 410 and registers the QoS scenario ID and QoS level identifier in the register (Reg[QoS]) at step 510. The QoS scenario ID and QoS level identifier stored in the Reg [QoS] are used to identify the QoS guaranty scheme to be applied at step 530. The CPU 110 executes a code for the corresponding QoS scenario ID and QoS level identifier registered in Reg[QoS] at step 520.

The QoS manager 140 decodes the QoS scenario ID and QoS level identifier registered in the Reg[QoS]—written by the CPU 110—and sets the QoS guaranty scheme corresponding thereto at step 540. Meanwhile, the request handlers 150 and 160 process the request from the respective processors, i.e. the DSP 120 and GPU 130, and analyze the traffic of the processors respectively at step 580. In order to prevent the request handlers 150 and 160 from overload, only the number of traffic occurrence times is used for the measurement of the traffic amount.

The QoS manager 140 analyzes the QoS scenario ID and QoS level identifier decoded at step 540 and the traffic information received from the request handlers 150 and 160 at step 550. The QoS manager 140 determines whether it is necessary to compensate the QoS level at step 560. If so, the QoS manager 140 compensates the QoS level at step 570. For example, if the QoS scenario or the QoS level decoded at step 540 is higher or lower as compared to the traffic information received from the request handlers 150 and 160, the QoS manager 140 can adjust or compensate the QoS level according to the received traffic information.

The QoS level adjustment can be executed as follows. For example, when the traffic amount of the other processors 120 and 130 is out of the reference traffic range corresponding to the current QoS level, the QoS manager 140 alleviates the QoS guaranty for the processor that is currently QoS-guaranteed and allows an increase of the traffic of other processors because the excessive traffic restriction may cause a system overload. In an opposite case where the traffic amount of the other processors 120 and 130 is in the reference traffic range corresponding to the current QoS level, the QoS manager 140 compensates the QoS level to some high extent to intensify the QoS guaranty because the further traffic restriction causes no system overload.

In another exemplary embodiment of the present invention, if the traffic amount of the other processors 120 and 130 is greater than the reference traffic amount, the QoS manager 140 can increase the QoS level for intensifying the QoS guaranty. Otherwise, if the traffic amount of the other processors 120 and 130 is equal to or less than the reference traffic amount, the QoS manager 140 can decrease the QoS level for alleviating the traffic restriction since there is no danger of system overload.

The QoS level adjustment scheme can be configured by the user, the system manufacturer, or the software provider.

If it is determined at step 560 that the current QoS level is proper, the QoS manager 140 returns to step 550 to again receive and analyze the traffic information.

While the QoS manager 140 controls the traffic for QoS guaranty, the CPU 110 can execute the application requiring QoS guaranty efficiently and stably at step 530.

Although not depicted in FIG. 5, the QoS guaranty can be secured in the scheme corresponding to the QoS scenario and QoS level by blocking or restricting the traffic of the individual technologies temporarily according to the QoS scenario and QoS level configured by the QoS manager 140 as in the first exemplary embodiment.

By discriminating the QoS schemes according to the QoS levels, it is possible to improve the flexibility of the QoS scenario application and reduce the holding time of the multiple processors including CPU 110. Furthermore, even when an abrupt change occurs, the QoS manager 140 can change the QoS scheme using the instant QoS guaranty method.

Although the description has been made under the assumption that the processor is used as the unit of traffic control, exemplary embodiments of the present invention can be applied to a system in which the traffic is controlled in unit of core.

As described above, an exemplary traffic control method and apparatus of the present invention is capable of adjusting the required bandwidths of individual technologies and guaranteeing the real-timeness in the multiprocessor system or multi-core system.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Furthermore, the respective block diagrams may illustrate parts of modules, segments or codes including at least one or more executable instruction for performing specific logic function(s). Moreover, it should be noted that the functions of the blocks may be performed in different order. For example, two successive blocks may be performed substantially at the same time, or may be performed in reverse order according to their functions.

The term "module" according to the exemplary embodiments of the invention, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

The foregoing disclosure has been set forth merely to illustrate exemplary embodiments of the invention and is not intended to be limiting. Since modifications of the disclosed exemplary embodiments incorporating the spirit and substance of the invention may occur to persons skilled in the art, the invention should be construed to include everything within the scope of the appended claims and equivalents thereof.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A multiprocessor system for controlling a traffic of a processor, the multiprocessor system comprising:
   two or more processors;
   two or more request handlers, each of the two or more request handlers processing a traffic request of a corresponding processor among the two or more processors; and
   a Quality of Service (QoS) manager for determining whether the traffic request requests QoS guaranty based QoS information and transmitting a traffic adjustment signal to each of the two or more request handlers according to the determined result,
   wherein each of the two or more request handlers adjusts the traffic of the corresponding processor according to the traffic adjustment signal and the QoS information indicates at least QoS scenario.

2. The multiprocessor system of claim 1, wherein the QoS manager transmits, if a QoS scenario identifier and a QoS level identifier are received from one among the two or more processors, the traffic adjustment signal instructing to adjust the traffic in a QoS guaranty scheme corresponding to the QoS scenario identifier and the QoS level identifier.

3. The multiprocessor system of claim 2, wherein each of the two or more request handlers analyzes the traffic of the corresponding processor and transmits traffic amount information to the QoS manager, and the QoS manager receives and analyzes, if the QoS scenario identifier and the QoS level identifier are received from one among the two or more processors the traffic amount information, determines whether QoS level compensation is necessary based on the traffic amount of the first processor, and compensates, if the QoS level compensation is necessary, the QoS level.

4. The multiprocessor system of claim 3, wherein the QoS manager comprises a register and receives the QoS scenario identifier and the QoS level identifier from one among the two or more processors by detecting the QoS scenario identifier and the QoS level identifier registered in the register.

5. The multiprocessor system of claim 1, wherein the QoS manager transmits, if completion of traffic transmission relating to the traffic request is detected, a traffic adjustment release signal to each of the two or more request handlers, and each of the two or more request handlers ends, if the traffic adjustment release signal is received, the adjustment of the traffic of the corresponding processor.

6. The multiprocessor system of claim 1, wherein the QoS manager transmits, if a QoS guaranty end instruction for the traffic request is received from one among the two or more processors, a traffic adjustment release signal to each of the two or more request handlers, and each of the two or more request handlers ends, if the traffic adjustment release signal is received, the adjustment of the traffic of the corresponding processor.

7. The multiprocessor system of claim 1, wherein the QoS manager comprises a register and receives a QoS guaranty start instruction and a QoS guaranty end instruction of the traffic request from one among the two or more processors by detecting a processor identifier registered in the register.

8. The multiprocessor system of claim 1, wherein the traffic adjustment signal comprises a traffic blocking signal, and the request handler blocks, if the traffic blocking signal is received, the traffic of the corresponding processor.

9. The multiprocessor system of claim 1, wherein the traffic adjustment signal comprises a traffic adjustment method, and further wherein the traffic adjustment method comprises at least one of permitting a predetermined amount of traffic of a processor and rejecting all traffic of a processor.

10. The multiprocessor system of claim 1, further comprising a memory,
wherein, the traffic adjustment signal comprises a traffic adjustment method, and further wherein the traffic adjustment method comprises permitting a processor to read data from the memory and blocking a processor from writing data to the memory.

11. A traffic control method of a multiprocessor system including two or more processors, two or more request handlers and a QoS manager, the method comprising:
processing, at each of the two or more request handlers, a traffic request of a corresponding processor among the two or more processors;
determining whether the traffic request requests QoS guaranty based QoS information and transmitting a traffic adjustment signal from the QoS manager to each of the two or more request handlers according to the determined result; and
adjusting, at each of the two or more request handlers, the traffic of the corresponding processor according to the traffic adjustment signal,
wherein the QoS information indicates at least QoS scenario.

12. The method of claim 11, wherein the QoS manager transmits, if a QoS scenario identifier and a QoS level identifier are received from one among the two or more processors, the traffic adjustment signal instructing to adjust the traffic in a QoS guaranty scheme corresponding to the QoS scenario identifier and the QoS level identifier.

13. The method of claim 12, further comprising:
analyzing, at each of the two or more request handlers, the traffic of the corresponding processor;
transmitting traffic amount information from each of the two or more request handlers to the QoS manager;
receiving and analyzing, at the QoS manager if the QoS scenario identifier and the QoS level identifier are received from one among the two or more processors, the traffic amount information;
determining whether QoS level compensation is necessary based on the traffic amount of the traffic request; and
compensating, if the QoS level compensation is necessary, the QoS level.

14. The method of claim 13, wherein the QoS manager comprises a register and receives the QoS scenario identifier and the QoS level identifier from one among the two or more processors by detecting the QoS scenario identifier and the QoS level identifier registered in the register.

15. The method of claim 11, further comprising:
transmitting, if completion of traffic transmission relating to the traffic request is detected, a traffic adjustment release signal from the QoS manager to each of the two or more request handlers; and
ending, at each of the two or more request handlers if the traffic adjustment release signal is received, the adjustment of the traffic of the corresponding processor.

16. The method of claim 11, further comprising:
transmitting, if a QoS guaranty end instruction for the second processor is received from one among the two or more processors, a traffic adjustment release signal from the QoS manager to each of the two or more request handlers; and
ending, at each of the two or more request handlers if the traffic adjustment release signal is received, the adjustment of the traffic of the corresponding processor.

17. The method of claim 11, wherein the QoS manager comprises a register and receives a QoS guaranty start instruction and a QoS guaranty end instruction of the traffic request from one among the two or more processors by detecting a processor identifier registered in the register.

18. The method of claim 11, wherein the traffic adjustment signal comprises a traffic blocking signal, and the request handler blocks, if the traffic blocking signal is received, the traffic of the corresponding processor.

19. The method of claim 11, wherein the traffic adjustment signal comprises a traffic adjustment method, and further wherein the traffic adjustment method comprises at least one of permitting a predetermined amount of traffic of a processor and rejecting all traffic of a processor.

20. The method of claim 11, wherein, the traffic adjustment signal comprises a traffic adjustment method, and further wherein the traffic adjustment method comprises permitting a processor to read data from a memory and blocking a processor from writing data to the memory.

21. The apparatus of claim 1, wherein the QoS information includes at least one of a QoS scenario identifier or a QoS level identifier of a processor.

22. The method of claim 11, wherein the QoS information includes at least one of a QoS scenario identifier or a QoS level identifier of a processor.

* * * * *